United States Patent [15] 3,671,588
Murray et al. [45] June 20, 1972

[54] OXIDATION OF CYCLOHEXANE

[72] Inventors: Edward J. Murray, Snyder; Leon O. Winstrom, East Aurora, both of N.Y.

[73] Assignee: Allied Chemical Corporation, New York, N.Y.

[22] Filed: June 30, 1969

[21] Appl. No.: 837,890

[52] U.S. Cl. .................................260/586 B, 260/631 R
[51] Int. Cl. .........................................C07c 45/02
[58] Field of Search.....................260/586 B, 631

[56] References Cited

UNITED STATES PATENTS 2,223,494  12/1940  Loder.................................260/586 B
2,974,161  3/1961  Keith et al....................260/586 BC X

*Primary Examiner*—Bernard Helfin
*Assistant Examiner*—Norman Morgenstern
*Attorney*—Albert L. Gazzola and Gerard P. Rooney

[57] ABSTRACT

The invention relates to an improvement in the liquid phase catalytic oxidation of cyclohexane to cyclohexanone and cyclohexanol at elevated temperatures and superatmospheric pressures using an oxygen containing gas, such as oxygen or air, while maintaining substantially anhydrous conditions by removal of water during the oxidation reaction. The improvement resides in the use of more than one part and less than about six parts by weight of benzene per part of cyclohexane in the oxidation feedstock. Significantly increased yields of the above oxidation products, particularly at high cyclohexane oxidation conversion levels, are realized by utilizing this process.

6 Claims, No Drawings

3,671,588

OXIDATION OF CYCLOHEXANE

BACKGROUND OF THE INVENTION

Cyclohexanone and cylohexanol are precursors of epsilon caprolactam, starting material in the manufacture of polyepsilon caprolactam polymer (nylon). These precursors previously have been prepared by the liquid phase oxidation of cyclohexane, in the presence and absence of water, using an oxygen-containing gas as oxidant, at various elevated temperatures and superatmospheric pressures, in the presence of a hydrocarbon soluble polyvalent metal oxidation catalyst such as cobalt or manganese napthenate and an oxidation initiator such as cyclohexanone, acetaldehyde, and the like, as hereinafter described. By the procedures of the prior art, yields of cyclohexanone and cyclohexanol decrease rapidly as the oxidation conversion level of cyclohexane is increased. For instance, with very low cyclohexane conversion levels, e.g. below 5 percent of the cyclohexane charged, the yield by prior art methods of cyclohexanone and cyclohexanol is 85-90 percent. However, when the cyclohexane conversion levels are increased to between 5 and 12 percent, yields are reduced to 65-85 percent, and when it is even higher, e.g. about 14-15 percent, the cyclohexanone and cyclohexanol yield falls to about 50-65 percent.

The yields of the above oxidation products, according to the present invention, are significantly improved when cyclohexane conversion levels are over 5 percent. With conversion levels of from 5-12 percent, yields of 85-90 percent are attained and with conversion levels of over 12 percent, yields of 65-85 percent of the above oxidation products are made possible by this invention.

Additionally, the above oxidation products are produced with relatively low formation of dicarboxylic acid side products, such as adipic acid.

SUMMARY OF THE INVENTION

By the present invention, improved yields of cyclohexanone and cyclohexanol oxidation products are obtained at cyclohexane levels of above 5 percent, by charging a cyclohexane feedstock with more than one part and less than six parts benzene, preferably 2.0 to 4.0 parts of benzene, per part by weight of cyclohexane, while continuously removing water from the oxidation mixture substantially as rapidly as formed. It has now been found that yields of 65-85 percent based on the cyclohexane converted are attained with the process of the present invention at cyclohexane conversion levels greater than 12 percent, and yields of 85-95 percent when the cyclohexane conversion levels are in the order of about 5-12 percent. These results are completely unexpected in view of prior art teachings such as disclosed in U.S. Pat. No. 2,223,493 and on page 261 of I.V. Berezin, E. T. Denisov and H. M. Emanuel, "The Oxidation of Cyclohexane," Pergamon Press, New York, N.Y. 1966, showing a decrease in yields of the above oxidation products when benzene is present in substantial quantities in the oxidation feedstocks, as high as up to 99 percent of the cyclohexane present. This quantity of benzene approaches one part of benzene to one part of cyclohexane by weight, which exemplifies the lower limit at which this invention is not considered operable.

DETAILED DESCRIPTION OF THE INVENTION

In carrying out the oxidation of cyclohexane in the presence of more than one part and less than six parts of benzene according to this invention, the oxidation conditions must be kept substantially anhydrous by continually removing water during the reaction. The use of a metallic catalyst and oxidation initiator, coupled with oxidation at elevated temperatures, of up to about 250° C. under superatmospheric pressure of 50-500 psig., or higher, and the continuous removal of water during the oxidation process, previously have been employed in the prior art. What has been discovered by this invention is that in the presence of a critical quantity of benzene, during this oxidation of cyclohexane under substantially anhydrous conditions, increased yields of cyclohexanone and cyclohexanol oxidation products are obtained. The quantity of benzene present in the reaction mixture according to this invention, is in a range substantially greater than the quantity of cyclohexane present, e.g. more than one and less than six parts of benzene per part by weight of cyclohexane. Particularly good yields result when the oxidation is carried out with 2.0-4.0 parts of benzene, between 160°-180° C. and under a pressure of 130-200 p.s.i.g.

The addition of more than six parts per weight of benzene per part of cyclohexane in the oxidation feedstocks, while effective, becomes impractical because of the small quantity of cyclohexane available for oxidation. Should less than one part of benzene be present the yields of cyclohexanone-cyclohexanol oxidation products are not more significantly improved over those of the prior art. Best results are attained when between 2.0-4.0 parts of benzene per part of cyclohexane are used in the oxidation reaction mixture.

The oxidation process of this invention is preferably carried out in the presence of conventional hydrocarbon soluble polyvalent metal oxidation catalyst. Representative examples of such compounds include stearates, acetylacetonates and other organic derivatives of cobalt, manganese, cerium, nickel, iron, lead, titanium, vanadium, molybednum, uranium, platinum, and silver. Preferred catalysts are cobalt and manganese salt of the naphthenic acids and cobalt and manganese salts of acetic and stearic acids. Cobalt containing catalysts such as cobalt naphthenate (commercially available as "Cobalt Nuodex" or "Cobalt Uversol") provide especially good results. Mixtures of these catalysts and equivalent compounds are contemplated in this connection also. In order to achieve reasonably good yields of cyclohexanone and practical reaction rates, we dissolve an amount of metallic catalyst compound in the oxidation feedstock sufficient to provide as little as about 0.02, and preferably to provide about 0.2 to 0.5 atomic proportions of metal per million parts by weight of the feedstock. Changing amounts of the catalyst compound providing as much as about 0.7 atomic proportions of dissolved metal per million parts of feed-stock, while effective, provides no additional advantage.

As suitable additives which promote initiation of oxidation according to the present process, any of the following well-known cyclohexane oxidation initiators may be employed: cyclohexanone, cyclohexylperoxide, cyclohexylhydroperoxide, peracetic acid, perbenzoic acid, benzoyl peroxide, hydrogen peroxide, sodium peroxide, and the like. Cyclohexanone, cyclohexylhydroperoxide, and cyclohexylperoxide are preferred oxidation initiators. An especially good result is obtained employing relatively stable and inexpensive cyclohexanone to initiate the reaction. The amount of oxidation initiator charged is not critical but in general about $0.15 \times 10^{-6}$ to $1.5 \times 10^{-4}$ moles and advantageously about $8 \times 10^{-6}$ to $20 \times 10^{-6}$ moles of initiator per part by weight of feedstock are employed.

In carrying out the oxidation of cyclohexane in the presence of the specified quantities of benzene according to this invention, elevated temperatures of up to about 250° C. and superatmospheric pressures of at least about 50 and up to about 500 p.s.i.g. are utilized. The present oxidation is carried out in any suitable equipment, e.g. tubular reactors, tower reactors, and the like. Best results, however, are obtained when the oxidation vessel which is employed is a stirred autoclave, or when the process is operated in a continuous manner, a number of such stirred autoclaves in a series. Each autoclave in the series being equipped with a water removing means. This equipment is well known in the art.

In order to insure reaction under anhydrous conditions, the water formed during the oxidation reaction, together with minor amounts of water introduced with the oxygen-containing gas must be continually removed. For example, the water may be removed by condensing the overhead vapor comprising a water-cyclohexane-benzene azeotrope. This may be accomplished as disclosed in U.S. Pat. No. 2,557,281, by allowing the condensate to stratify into an upper organic layer and a lower aqueous layer. The water layer is separated off and the organic layer containing benzene and cyclohexane are recycled to the oxidation reaction mixture.

The cyclohexanone and cyclohexanol reaction products are recovered from the oxidation mass by distilling off under reduced pressure unreacted cyclohexane and benzene, which may be recycled to a succeeding reaction, leaving the cyclohexanol and cyclohexanone in the distillation residue. The alcohol may be converted to the ketone by known methods of catalytic dehydrogenation. The cyclohexanone, of course, may be used as a precursor in the preparation of epsilon caprolactam.

It is an advantage of the present invention that it can be performed in either continuous or batchwise manner.

The percentage of cyclohexane consumed in the oxidation according to this invention, is more than twice the percentage of benzene consumed. This is surprising inasmuch as liquid phase air oxidation of benzene is known to be promoted by small amounts of cyclohexane (N.M. Emanuel and E.T. Denisov, Doklady Akad. Nauk. SSSR (Phys. Chem. Sect.) 117 458–61 (1957); Engl. transl. p. 719–21). Generally, the amount of benzene consumed in the present oxidation is less than about 10 weight percent of the benzene charged.

The following examples are illustrative of this invention. Parts, percentages and proportions are by weight or as otherwise noted, and temperatures are in degrees centigrade. Example 1 exemplifies a specific embodiment of this invention. Examples 2 and 3 are comparative examples wherein the low yields of cyclohexanol and cyclohexanone oxidation products are attained when using a quantity of benzene outside the scope of this invention.

EXAMPLE 1

A mixture of 0.33 parts (corresponding to about 20 ppm. metallic cobalt based on the reaction feedstock) of Cobalt Uversol (a mineral oil solution of cobalt naphthenate containing about 6 percent cobalt, Harshaw Chemical Co.) 200 parts (2.38 mol) cyclohexane, 800 parts (10.24 mol, 4 parts per part cyclohexane) of benzene and 1.89 parts (0.0193 mol) of cyclohexanone initiator is charged to a stainless steel autoclave equipped with an impeller agitator. The autoclave is vented to the atmosphere through a water cooled pressure condenser and a phase separator for separating condensed effluent vapors of water, benzene and cyclohexane and return the benzene and cyclohexane to the reaction mixture.

Air is introduced below the surface of the reaction mixture to raise the pressure of the system to about 155 p.s.i.g. and the rate of air flow is adjusted to about 3.1 standard cubic feet per hour (corresponding to about 26.3 parts of oxygen, (about 0.82 mol) per hour. The mixture is vigorously agitated and heated to 165° over a period of about 15 to 20 minutes to initiate oxidation the commencement of which is indicated by a sharp decrease in the oxygen content of the effluent gas from about 9.8 percent to 3.5 percent by volume. The oxidation is continued for about 90 minutes under the foregoing conditions of pressure, temperature and rate of air supply. Vapors from the oxidation vessel, are collected in the condenser so that the water contained therein is removed substantially as rapidly as formed. The aqueous condensate is allowed to stratify in the phase separator and the upper cyclohexane-benzene layer which thereby separates is continuously withdrawn and recycled to the oxidation.

Thereafter, the air flow is stopped and the agitated mass is cooled to about 50°–60° under pressure. After release of pressure, the reaction mixture is discharged from the autoclave and cooled to ambient temperature. The crude oxidation product (about 996 parts) contains 17.08 percent (ca. 170 parts, 2.02 mol) cyclohexane, 1.8 percent (17.9 parts, 0.183 mol) cyclohexanone, 1.2 percent (11.95 parts, 0.119 mol) of cyclohexanol (including any cyclohexanol values in carboxylic acid side product ester), 0.37 percent (3.68 parts, 0.0252 mol) of carboxylic acid side products (substantially adipic acid), 75.1 percent (747 parts, 9.58 mols) of benzene and about 4.5 percent (4.48 parts) of other oxidation by-products, for example high molecular weight resins and tars. The conversion (i.e. attack) of cyclohexane, which is computed as the molar percentage of cyclohexane consumed in the oxidation based on cyclohexane charged, is about 15 percent. The conversion of benzene, which is computed as the molar percentage of benzene consumed based on benzene charged, is about 6.6 percent. The yield of cyclohexanone and cyclohexanol (computed as the molar percentage of the cyclohexanone and cyclohexanol of the reaction product based on the cyclohexane consumed) is 84.6 percent. The corresponding cyclohexanone-cyclohexanol yield, discounting the minor amount of cyclohexanOne charged as initiator, is 79.3 percent. The mol-percent yield of the carboxylic acid side product (computed as adipic acid based on cyclohexane consumed) is about 7.1 percent.

EXAMPLE 2

The procedure of Example 1 is repeated substantially as described except that 1,000 parts (11.87 mols) of cyclohexane are charged in place of the benzene-cyclohexane mixture and the air feed rate is maintained at about 4 to 5 standard cubic feet per hour (corresponding to about 1.06 to 1.34 mols of oxygen per hour) to obtain 15 percent conversion of the cyclohexane in the reaction period of 90 minutes.

The crude reaction mass (about 1,023 parts) contained 83.0 percent (about 850 parts, 10.09 mols) cyclohexane, 4.5 percent (about 46.1 parts, 0.469 mol) cyclohexanone, 5.2 percent (about 53.2 parts, 0.531 mol) cyclohexanol, 1.3 percent (about 13.3 parts 0.091 mols) of carboxylic acid side product and 5.92 percent (60.2 parts) of other oxidation side products. The yield of cyclohexanone and cyclohexanol computed as in Example 1 is only 56.2 percent (or 55 percent discounting the 0.0194 mol of cyclohexanone charged as initiator). The yield of carboxylic acid side product computed as in Example 1 is 5.1 percent.

This example illustrates the relatively low yields of cyclohexanone and cyclohexanol which are obtained at a high level of conversion of cyclohexane (i.e. 15 percent) in the air oxidation of cyclohexane in the absence of benzene.

EXAMPLE 3

The procedure of Example 1 is repeated substantially as described in oxidizing a mixture of 500 parts (5.94 mols) of cyclohexane and 500 parts (6.41 mols, 1 part per part of cyclohexane) of benzene employing about 0.474 parts (4.83 × $10^{-3}$ mol) of cyclohexanone as initiator, 0.201 parts of Cobalt Uversol (corresponding to about 12 ppm cobalt based on the reaction feed-stock) as catalyst and the air feed rate is maintained of about 3.89 standard cubic feet per hour [corresponding to about 33.0 parts (about 1.03 mol) oxygen per hour].

The resultant oxidation product (about 989 parts) contains 42.6 percent (corresponding to about 421 parts, 4.99 mols) cyclohexane, 2.59 percent (corresponding to about 25.6 parts, 0.261 mol) cyclohexanone, 2.49 percent (corresponding to about 24.6 parts 0.246 mol) of cyclohexanol, less than .01 percent (corresponding to less than 0.1 part or 0.68 × $10^{-3}$ mol) of carboxylic acid side product, 3.33 percent (corresponding to about 32.9 parts) of other oxidation side products and 49.0 percent (corresponding to about 485 parts, 6.21 mol) of benzene.

The conversions of cyclohexane and benzene computed as in Example 1 are 15.8 percent and 3 percent respectively, the yield of cyclohexanone and cyclohexanol computed as in Example 1 is only 54 percent (53.5 percent discounting the cyclohexanone charged as initiator).

We claim:

1. In the catalytic liquid phase oxidation of cyclohexane to cyclohexanone and cyclohexanol in the presence of a polyvalent metal oxidation catalyst and an oxidation initiator with an oxygen-containing gas at elevated temperatures of up to 250° C. and superatmospheric pressures of between about 50 – 500 p.s.i.g., under substantially anhydrous conditions, the improvement comprising conducting the oxidation in the presence of more than one part and less than six parts by weight of benzene per part of cyclohexane.

2. A process as in claim 1 wherein the concentration of benzene is from 2.0–4.0 parts by weight per part of cyclohexane.

3. A process as in claim 2 wherein the reaction temperature is between 160°–180° C., and the reaction pressure is 130–200 p.s.i.g.

4. A process as in claim 3 wherein cyclohexanone is added as an initiator.

5. A process as in claim 4 wherein cobalt naphthenate is used as a catalyst.

6. The process of claim 1 wherein water is continuously removed substantially as rapidly as it is formed during the oxidation.

* * * * *